(12) United States Patent
Liu et al.

(10) Patent No.: US 11,380,903 B2
(45) Date of Patent: Jul. 5, 2022

(54) INTEGRATED BIPOLAR ELECTRODE, PREPARATION METHOD AND USE THEREOF

(71) Applicant: CENTRAL SOUTH UNIVERSITY, Hunan (CN)

(72) Inventors: Suqin Liu, Changsha (CN); Xiugui Yuan, Changsha (CN)

(73) Assignee: CENTRAL SOUTH UNIVERSITY, Hunan (CN)

(*) Notice: Subject to any disclaimer, the term of this patent is extended or adjusted under 35 U.S.C. 154(b) by 2 days.

(21) Appl. No.: 16/976,872

(22) PCT Filed: Dec. 28, 2018

(86) PCT No.: PCT/CN2018/124579
§ 371 (c)(1),
(2) Date: Aug. 31, 2020

(87) PCT Pub. No.: WO2020/098106
PCT Pub. Date: May 22, 2020

(65) Prior Publication Data
US 2020/0411882 A1 Dec. 31, 2020

(30) Foreign Application Priority Data
Nov. 13, 2018 (CN) .......................... 201811347620.7

(51) Int. Cl.
*H01M 4/86* (2006.01)
*H01M 4/88* (2006.01)
(Continued)

(52) U.S. Cl.
CPC ........... *H01M 4/8657* (2013.01); *H01M 4/88* (2013.01); *H01M 8/188* (2013.01); *H01M 2004/029* (2013.01)

(58) Field of Classification Search
CPC .............................................. H01M 2004/029
See application file for complete search history.

(56) References Cited

U.S. PATENT DOCUMENTS

| | | | |
|---|---|---|---|
| 2013/0244131 A1 | 9/2013 | Arcella | |
| 2014/0272484 A1* | 9/2014 | Li | H01M 8/20 429/51 |

FOREIGN PATENT DOCUMENTS

| | | |
|---|---|---|
| CN | 101651220 A | 2/2010 |
| CN | 201444489 U | 4/2010 |

(Continued)

OTHER PUBLICATIONS

CN 103268945 (Year: 2021).*
International Search Report in the international application No. PCT/CN2018/124579, dated Jun. 27, 2019.

*Primary Examiner* — Brian R Ohara
(74) *Attorney, Agent, or Firm* — Syncoda LLC; Feng Ma (57) ABSTRACT

An integrated bipolar electrode includes a laminated structure and a bipolar plate. The laminated structure is formed by interconnecting an anode active material layer with a cathode active material layer. The bipolar plate is sandwiched in a hollow cavity of the laminated structure. Side surfaces of the laminated structure are provided with a sealing layer for mating with a bipolar electrode fixing frame to prevent an anolyte and a catholyte from permeating into each other. The anode active material layer and the cathode active material layer in the integrated bipolar electrode are directly connected. A contact resistance between the anode active material layer and the cathode active material layer is quite low, and a battery prepared finally has better performances.

11 Claims, 10 Drawing Sheets

(51) Int. Cl.
*H01M 8/18* (2006.01)
*H01M 4/02* (2006.01)

(56) References Cited

FOREIGN PATENT DOCUMENTS

| | | |
|---|---|---|
| CN | 103219521 A | 7/2013 |
| CN | 103268945 A | 8/2013 |
| CN | 103682476 A | 3/2014 |
| CN | 104300157 A | 1/2015 |
| CN | 105529486 A | 4/2016 |
| CN | 104577132 B | 11/2016 |
| CN | 107240721 A | 10/2017 |
| CN | 108023104 A | 5/2018 |
| CN | 108565473 A | 9/2018 |

* cited by examiner

INTEGRATED BIPOLAR ELECTRODE, PREPARATION METHOD AND USE THEREOF

CROSS-REFERENCE TO RELATED APPLICATIONS

The present application is a national stage of International Application No. PCT/CN2018/124579 filed on Dec. 28, 2018, which claims priority to Chinese Patent Application No. 201811347620.7, filed on Nov. 13, 2018. The disclosures of these applications are hereby incorporated by reference in their entireties.

TECHNICAL FIELD

The disclosure relates to the field of battery materials, and in particular relates to an electrode, a preparation method and a use thereof.

BACKGROUND

An all-vanadium redox flow battery has advantages such as a long service life, adjustable capacity and power, high-current deep discharging with no destroy, running safely, easy operation and maintenance, no environmental pollution and others. Therefore, the all-vanadium redox flow battery has become a preferable candidate for storage of energy generated by an intermittent, unstable and renewable energy resource, such as solar energy, tidal energy and wind energy.

In an existing vanadium battery, a conductive current collector usually is a flexible graphite plate or prepared by mixing raw materials including graphite, high-density polyethylene powder, carbon fiber and conductive carbon black. In particular, its mixing and preparation process is usually as follows: the raw materials are formulated in proportions at an ambient temperature, anhydrous ethanol is used as a dispersing agent, a resin powder and a conductive filler are mixed sufficiently by magnetic stirring, then the mixture is poured into a stainless steel evaporating dish and placed in a drying oven to dry for about 20 min at 100° C., the dried mixture is shaped by pressing in a mould and finally placed in the drying oven to dry for about 15 min at 150° C., and then the dried mixture is taken out for cooling with air.

In the prior art, in order to simplify a process for assembling an electric pile, an integrated composite electrode is prepared by hot-pressing or bonding the conductive current collector and an active electrode material together. When the active electrode material is combined with the conductive current collector through hot-pressing or a conductive bonding layer, the active electrode material and the conductive current collector need to be bonded firmly, with good conductivity. An adhesive is firstly stirred into a paste with a mixture of water and ethanol and then it is uniformly smeared on the conductive current collector. Then a processed graphite felt is stably pressed on the conductive current collector. A certain pressure is applied to the graphite felt and the conductive current collector. The graphite felt and the conductive current collector are kept in a thermostat at 160° C. for 10 min. The integrated composite electrode is obtained after cooling and taking out of the thermostat.

The integrated composite electrode may include two categories: an end electrode connecting with a lug, and a bipolar electrode two sides of which are in contact with two diaphragms respectively. The conductive current collector arranged in the bipolar electrode is also called a bipolar plate, which not only connects an anode and a cathode of two adjacent cells, but also completely isolates an anolyte from a catholyte. Therefore, the conductive current collector needs to not only have a good electronic conductivity, but also acid resistance, oxidation resistance, impermeability of an electrolyte and other properties. In the prior art, the bipolar plate is separated from a positive electrode material and a negative electrode material, and the bipolar plate is usually hot-pressed or bonded with the positive electrode material and the negative electrode material. As a result, assembling of electrodes is complicated and tedious, and a contact resistance between the bipolar plate and the electrode material is increased, which influences performance of the battery.

SUMMARY

The technical problem to be solved in the disclosure is to overcome the deficiencies and shortcomings mentioned in the above background and provide an integrated bipolar electrode having excellent performances, a preparation method and use thereof. There is no contact resistance between an anode active material and a cathode active material of the bipolar electrode in the disclosure, and an assembled battery may have excellent performances.

In order to solve the above technical problem, the disclosure provides an integrated bipolar electrode.

The integrated bipolar electrode may include a laminated structure and a bipolar plate (equivalent to a current collector in the prior art). The laminated structure is formed by interconnecting an anode active material layer with a cathode active material layer. The bipolar plate is sandwiched in a hollow cavity of the laminated structure, and side surfaces of the laminated structure are provided with a sealing layer for mating with a bipolar electrode fixing frame to prevent an anolyte and a catholyte from permeating into each other.

Preferably, in the integrated bipolar electrode, the bipolar plate is a non-conductive sheet which does not react with the anolyte and the catholyte (for example, having acid resistance and oxidation resistance) and is impermeable. More preferably, the bipolar plate is made of rubber, plastic or a complex of the rubber and the plastics. In the disclosure, a routine current collector in the prior art may be used as the bipolar plate, but it is not recommended because a property of isolating an electrolyte may be influenced by a high conductivity of the routine current collector which usually needs to have the high conductivity. Generally, the performance of isolating the electrolyte may be reduced if the existing current collector has the high conductivity. The performance of isolating the electrolyte may be improved if the existing current collector has a low conductivity. In this case, the conductivity of the existing current collector may be influenced, such that electrochemical performances of the battery prepared from such an existing current collector may be reduced. In addition, a conductive medium (such as carbon) contained in the existing current collector may react with the electrolyte when it is in contact with the electrolyte for a long time, thereby reducing a service life of the bipolar electrode. In the disclosure, a non-conductive sheet (for example, the rubber, the plastic and the like which are more preferable), which does not react with the electrolyte and is impermeable, is used as the bipolar plate. These materials are not only cheap, but also may completely avoid the anolyte and the catholyte permeate through the current collector, causing the problem of self-discharging of the battery. The non-conductive sheet may include, but is not limited to, polytetrafluoroethylene, poly(vinylidene fluoride), polyethylene, polypropylene, or fluorine rubber, silicone rubber and the like.

Preferably, in the integrated bipolar electrode, the anode active material layer and the cathode active material layer are graphite felts, carbon felts, carbon cloths or the conductive sheets containing a carbon material. More preferably, the anode active material layer and the cathode active material layer are polyacrylonitrile graphite felt.

Preferably, in the integrated bipolar electrode, a thickness h of the anode active material layer and/or the cathode active material layer at the side surface of the laminated structure is less than 1 mm. Alternatively, the anode active material layer and/or the cathode active material layer at the side surface of the laminated structure preferably is in a net shape. In the disclosure, the anode active material layer is in direct contact with the cathode active material layer to conduct electricity. Researches show that permeation of the electrolyte cannot occur between the anode active material layer and the cathode active material layer, when a contact part for connecting an anode with a cathode and side surfaces of the bipolar plate are sealed through an adhesive. In the disclosure, in order to further avoid a probability that the electrolyte permeates through the anode active material and the cathode active material adjacent to a side edge of the bipolar plate, the thickness h of the anode active material layer and/or the cathode active material layer adjacent to the side edge of the bipolar plate is controlled to be less than that of other parts (alternatively, preferably, the anode active material layer and the cathode active material layer adjacent to the side edge of the bipolar plate are in a form of net), thereby further reducing the probability that the electrolyte permeates through the anode active material layer and the cathode active material layer adjacent to the side edge of the bipolar plate.

Preferably, in the integrated bipolar electrode, both a material of the anode active material layer and a material of the cathode active material layer are identical. The laminated structure is formed by folding a single piece of sheet in half. The bipolar plate is arranged in the hollow cavity of the laminated structure. The anode active material layer and the cathode active material layer are a single piece of sheet, and the laminated structure may be formed by folding the single piece of sheet in half for one time or folding for several times, and thus a preparation process of the laminated structure is more simply. In addition, compared with folding the anode active material layer and the cathode active material layer which are separate from each other to contact with each other, the contact resistance is smaller and electron conduction is more favorable, when the anode active material layer and the cathode active material layer are a whole. In the bipolar electrode with such a structure, a material at the side surface of the laminated structure may be thinned or hollowed into a net structure, so as to further reduce the probability of permeation of the electrolyte.

Preferably, in the integrated bipolar electrode, the anode active material layer and the cathode active material layer are two separate sheets. The hollow cavity of the laminated structure is a sealed cavity formed by folding the two separate sheets, and the bipolar plate is arranged in the sealed cavity. In the above structure, namely, the bipolar plate is fully wrapped by the anode active material layer and/or the cathode active material layer, forming a fully-wrapped structure. In this case, a contact area of the anode active material layer and the cathode active material layer is relatively larger, and the electron conduction is relatively faster. In case of the fully-wrapped structure, it may be more convenient and have more advantages to coat the side surfaces of the laminated structure with the sealing layer.

As a general technical conception, the disclosure further provides a preparation method of the abovementioned integrated bipolar electrode. The preparation method may include the following steps.

At S1, a bipolar plate is inserted between an anode active material layer and a cathode active material layer to form a "sandwich" structure, and then an edge of the anode active material layer and/or the cathode active material layer is folded along a side edge of the bipolar plate to interconnect the anode active material layer with the cathode active material layer, followed by pressing a connected part.

At S2, the connected part formed in S1 is glued, such that the anode active material layer and the cathode active material layer form an interconnected whole.

At S3, side surfaces of the abovementioned "sandwich" structure are glued and sealed to form a sealing layer, thereby obtaining the integrated bipolar electrode.

The abovementioned preparation method is a generally applicable method. As for a special structure, the disclosure further provides a corresponding preparation method. When an anode active material and a cathode active material are a single piece of sheet, the preparation method may include the following two situations: the first situation (folding in half for one time in this case) may include the following steps.

At S1, the single piece of sheet is folded in half to form an anode active material layer and a cathode active material layer having an identical area, and then a bipolar plate is inserted between the anode active material layer and the cathode active material layer to form a three-layer overlaid structure.

At S2, side surfaces of the abovementioned three-layer overlaid structure are glued and sealed to form a sealing layer, thereby obtaining the integrated bipolar electrode.

A second situation (folding for several times in this case) may include the following steps.

At S1, the single piece of sheet is folded to allow the sheet to connect end to end, forming a cavity for receiving the bipolar plate. The two ends of the single piece of sheet are glued, and then the bipolar plate is inserted into the cavity to form a three-layer overlaid structure.

At S2, side surfaces of the three-layer overlaid structure are glued and sealed to form a sealing layer, thereby obtaining the integrated bipolar electrode.

When the anode active material and the cathode active material are separate sheets, the preparation method may include the following steps.

At S1, the bipolar plate is inserted between the two separate sheets to form a "sandwich" structure. An edge of at least one of the sheets is then folded along a side edge of the bipolar plate to allow the two separate sheets to be in direct contact with each other. A contact part is then pressed and glued, such that the bipolar plate is completely wrapped by the two separate sheets.

At S2, side surfaces of the "sandwich" structure are glued and sealed to form a sealing layer, thereby obtaining the integrated bipolar electrode.

When the anode active material layer and the cathode active material layer are two separate sheets having different areas, a ratio of an area of the anode active material layer to an area of the cathode active material layer is controlled to be 0.9-1.1 preferably, and a ratio of an area of the bipolar plate to a smaller area of the anode active material layer and the cathode active material layer is 0.8-1.5.

As a general technical conception, the disclosure further provides use of the abovementioned integrated bipolar electrode in an all-vanadium redox flow battery.

Preferably, in the abovementioned use, the all-vanadium redox flow battery may include at least one integrated bipolar electrode, a bipolar electrode fixing frame for fixing the integrated bipolar electrode, and a diaphragm for isolating an anolyte from a catholyte.

In order to facilitate understanding, the disclosure provides a typical preparation method (an anode active material layer and a cathode active material layer may have different areas and are separate sheets). The typical preparation method may include the following steps.

(1) In accordance with a requirement of an electric pile size, two rectangle polyacrylonitrile graphite felts are cut and used as the anode active material layer and the cathode active material layer. The anode active material layer and the cathode active material layer are controlled to have an identical width and different lengths. Herein the longer active material layer is referred to as a layer A, and another is referred to as a layer C. The two layers are washed in high-purity water, so as to remove dust and impurities adhered to their surfaces and broken fibers resulting from cutting. Then the active electrode materials after washing are centrifuged or dried, so as to remove 80-99.5% of water therein and be ready to be used.

(2) A rubber film having a width identical with those of the abovementioned anode and cathode active material layers and a length between those of the two is provided, which is referred to as a layer B and ready to be used.

(3) The layer B is inserted between the layer A and the layer C. The layer A is arranged under the layer B. Three sides of the respective layers A, B and C are aligned to each other. Then the fourth side of the layer A is folded upward along an edge of the layer B, so as to allow the layer A to be in contact with the layer C. A contact part is pressed. The pressed part and each side are glued and sealed with an epoxy resin, thereby obtaining the integrated bipolar electrode according to the disclosure.

In the prior art, researches of the bipolar electrode focus on high conductivity, acid resistance, oxidation resistance and impermeability of the current collector. In fact, these performances of the current collector being poor has become a critical factor which restrains the improvement of the performances of the redox flow battery. A research thought in the disclosure may excellently solve the problem existing in the prior art. The disclosure is mainly based on the following principles: 1) the anode active material layer is in direct contact with the cathode active material layer in the disclosure. Electrons are transferred through the contact part of the anode active material and the cathode active material. Electrons are transferred between the anode and the cathode without the aid of any intermediate adhesive or other polymers. The contact resistance is small. The battery prepared thereby has better performances. 2) The acid-resistant, oxidation-resistant and impermeable rubber or plastic and the like is arranged between the anode active material layer and the cathode active material layer in the disclosure. The abovementioned rubber or plastic between the anode active material and the cathode active material may completely isolate the anolyte from the catholyte. The anolyte and the catholyte may not permeate through the rubber or the plastic. Therefore, self-discharge of the battery may be avoided.

Compared with the prior art, the disclosure has the following beneficial effects.

1. The anode active material layer is in direct contact with the cathode active material layer in the integrated bipolar electrode of the disclosure. The contact resistance between the anode active material layer and the cathode active material layer is significantly small. The battery prepared thereby has better performances.

2. Compared with the preparation method of a traditional integrated bipolar electrode, the disclosure eliminates a process of hot-pressing or adhering the positive active electrode and the negative active electrode to the current collector, simplifying the preparation process, shortening the procedure flow and significantly reducing the cost.

BRIEF DESCRIPTION OF THE DRAWINGS

In order to explain the embodiments of the disclosure or the technical solution in the prior art more clearly, the drawings required for illustrating the embodiments or the prior art will be briefly introduced below. It is apparent that the drawings described below are some embodiments of the disclosure. Other drawings may further be obtained by those of ordinary skill in the art in accordance with these drawings without creative work.

REFERENCE NUMBERS

1: Anode active material layer; 2: Bipolar plate; 3: Cathode active material layer; 4: Sealing layer.

DETAILED DESCRIPTION

In order to facilitate understanding of the disclosure, the disclosure will be more comprehensively and meticulously described below with reference to the drawings and the preferred Examples. However, the scope of protection of the disclosure will not be limited to the following detailed Examples.

Unless otherwise defined, all terminologies to be used below may be identical with meanings usually understood by those skilled in the art. The terminologies to be used below are used to describe the detailed embodiments only and are not intended to limit the scope of protection of the disclosure.

Unless otherwise specified, various raw materials, agents, instruments, devices and the like to be used in the disclosure may be commercially available, or prepared through existing methods.

Example 1

Figure 1:
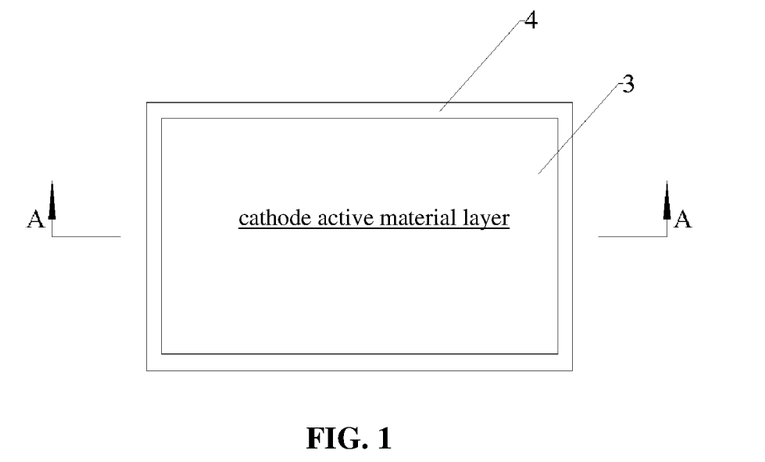
FIG. 1 illustrates a structure diagram of an integrated bipolar electrode in Example 1.

As shown in FIG. 1, an integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the abovementioned laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a polypropylene (PP) film. The sealing layer 4 is an acid-resistant and oxidation-resistant epoxy resin.

Figure 2:
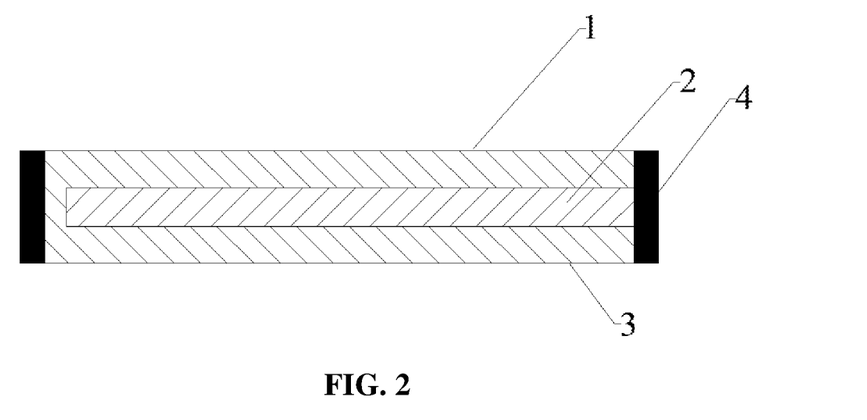
FIG. 2 illustrates a structure diagram (equivalent to a section view along an A-A line in FIG. 1) of the bipolar electrode in Example 1.

Specifically, as shown in FIG. 2, the laminated structure in this Example is formed by folding a single piece of polyacrylonitrile graphite felt in half, and the bipolar plate 2 is arranged in the hollow cavity of the laminated structure.

A preparation method of the integrated bipolar electrode in this Example may include the following steps.

(1) A polyacrylonitrile graphite felt with a length of 80 cm and a width of 40 cm was cut and submerged into deionized water for 10-30 min. Then the polyacrylonitrile graphite felt was taken out and placed in a centrifugal dryer to dewater for 1-2 min at a speed of 800-1200 rpm. A PP film with a length of 40 cm and a width of 40 cm was cut.

(2) The 80 cm×40 cm polyacrylonitrile graphite felt was folded in half along its longitudinal center line. The cut PP film was placed between the folded graphite felt such that the four sides of the PP film were aligned to the four sides of one half of the graphite felt.

(3) Side surfaces of the folded polyacrylonitrile graphite felt/PP/the polyacrylonitrile graphite felt were bonded and sealed with an epoxy resin, thereby obtaining the integrated bipolar electrode of this Example.

During actual sealing, in order to ensure a sealing effect of the side surfaces, edges of surfaces of the anode active material layer 1 and the cathode active material layer 3 may also be coated with a sealant during sealing the side surfaces generally, so as to allow the sealing layer of side surfaces to extend to the edges of the surfaces of the anode active material layer 1 and the cathode active material layer 3, obtaining a better sealing effect. For the convenience of description, the sealant on the edges of the surfaces of the anode active material layer 1 and the cathode active material layer 3 is not shown in the figures of this Example, similarly hereinafter.

The integrated bipolar electrode in this Example is used for an all-vanadium redox flow battery. The all-vanadium redox flow battery may include an end plate provided with a flow inlet and a flow outlet, a conductive lug, at least one abovementioned integrated bipolar electrode, a bipolar electrode fixing frame for fixing the abovementioned integrated bipolar electrode, and a diaphragm for isolating the anolyte from the catholyte.

The integrated bipolar electrode in this Example, a positive electrode, a negative electrode, the diaphragm and the like were assembled into a battery pack consisting of two cells through internal series connection. An energy efficiency of constant-current discharge and constant-current charge in presence of a current density of 100 mA cm$^{-2}$ is 79.8%. A coulombic efficiency thereof is 98.0%. The anolyte and the catholyte are completely impermeable.

Figure 3:
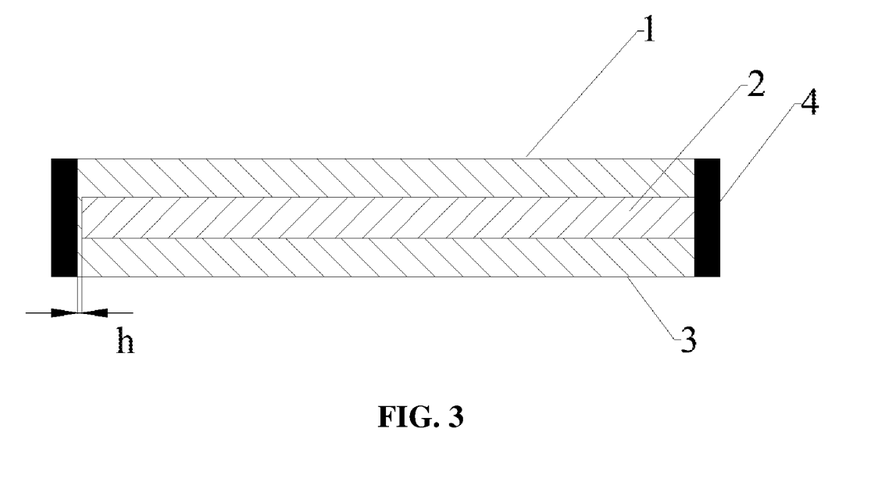
FIG. 3 illustrates another structure diagram of a bipolar electrode in Example 1.

In this Example, the polyacrylonitrile graphite felt at the side surface of the laminated structure (namely, near a folding crease) may be thinned, as shown in FIG. 3.

Figure 4:
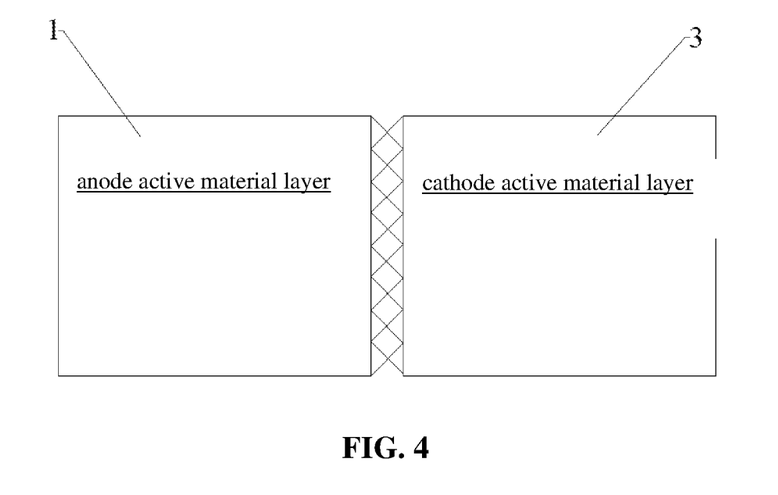
FIG. 4 illustrates a structure diagram when an anode active material layer and a cathode active material layer in Example 1 are unfolded.

In addition, in this Example, the polyacrylonitrile graphite felt at the side surface of the laminated structure (namely, adjacent to a folding crease) may be hollowed into a net shape, and the structure after unfolding the polyacrylonitrile graphite felt is shown in FIG. 4.

The integrated bipolar electrode, as shown in FIG. 3 or FIG. 4, is assembled into the battery pack consisting of two cells through the internal series connection. The energy efficiency of the constant-current discharge and the constant-current charge in presence of the current density of 100 mA cm$^{-2}$ is 79.3%. The coulombic efficiency thereof is 97.3%. The anolyte and the catholyte do not permeate into each other at all.

Example 2

An integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a polyethylene (PE) film. The sealing layer 4 is an acid-resistant and oxidation-resistant epoxy resin.

Figure 5:
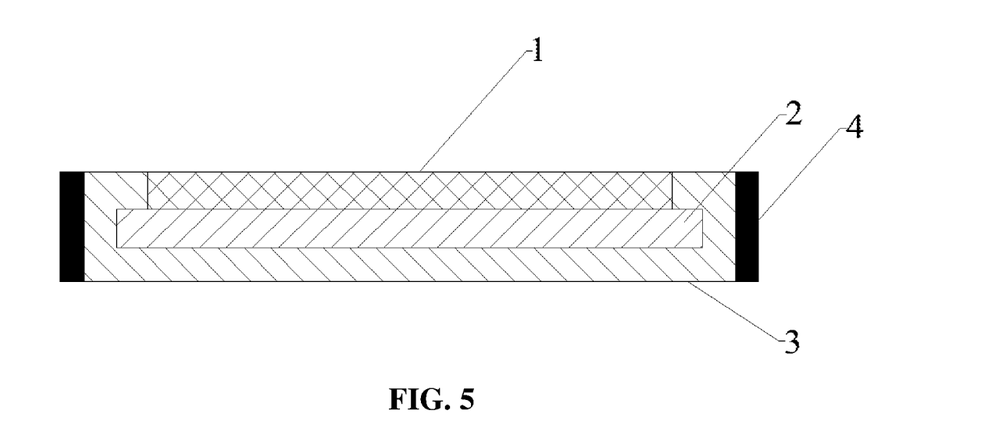
FIG. 5 illustrates a structure diagram of a bipolar electrode in Example 2.

Specifically, as shown in FIG. 5, the anode active material layer 1 and the cathode active material layer 3 are two separate sheets. The laminated structure is formed by folding the two separate sheets. Furthermore, an inner cavity of the laminated structure formed by the two separate sheets is a sealed cavity. The bipolar plate 2 is arranged in the sealed cavity (as shown in FIG. 5, for the convenience of description, an adhesive at a contact part of the two separate sheets is not shown, and there is a small overlapping area at the contact part of the two separate sheets which is pressed, similarly hereinafter).

A preparation method of the integrated bipolar electrode in this Example may include the following steps.

(1) A polyacrylonitrile graphite felt with a length of 65 cm and a width of 41 cm and a polyacrylonitrile graphite felt with a length of 68 cm and a width of 45 cm were cut respectively and submerged into deionized water for 10-30 min. Then the two polyacrylonitrile graphite felts were taken out and placed in a centrifugal dryer to dewater for 1-2 min at a speed of 800-1200 rpm. A PE film with a length of 66 cm and a width of 43 cm was cut.

(2) The 68 cm×45 cm polyacrylonitrile graphite felt was horizontally spread on an operating table. The cut PE film was placed in the center of the graphite felt in parallel. Then the 65 cm×41 cm polyacrylonitrile graphite felt was placed on the PE film in parallel, such that centers of the graphite felts coincide with a center of the PE film.

(3) Four sides of the polyacrylonitrile graphite felt at the bottom were folded upward along four side edges of the PE film and placed on the polyacrylonitrile graphite felt on the top, such that the polyacrylonitrile graphite felt on the top is in direct contact with the polyacrylonitrile graphite felt at the bottom. Then a contact part was glued and sealed with an epoxy resin.

(4) Side surfaces of the polyacrylonitrile graphite felt/PE/the polyacrylonitrile graphite felt were bonded and sealed with the epoxy resin, thereby obtaining the integrated bipolar electrode of this Example.

Figure 6:
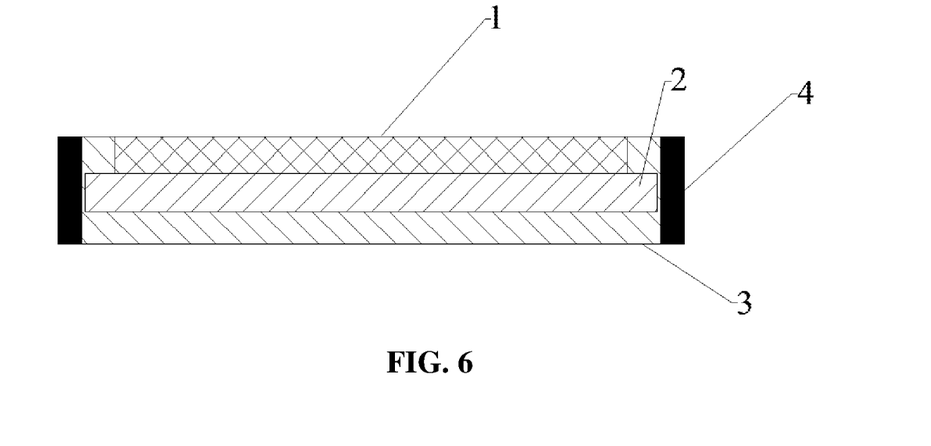
FIG. 6 illustrates another structure diagram of a bipolar electrode in Example 2.

In addition, as shown in FIG. 6, in this Example, the polyacrylonitrile graphite felt at the bottom may further be thinned at side surfaces of the laminated structure (namely, near a folding crease).

The integrated bipolar electrode shown in FIG. 6 is used for an all-vanadium redox flow battery. The integrated bipolar electrode shown in FIG. 6 was assembled into a battery pack consisting of two cells through internal series connection. An energy efficiency of constant-current discharge and constant-current charge in presence of a current density of 100 mA cm$^{-2}$ is 79.8%. A coulombic efficiency thereof is 97.5%. The anolyte and the catholyte do not permeate into each other at all.

Example 3

An integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a PP film. The sealing layer 4 is an acid-resistant and oxidation-resistant epoxy resin.

Figure 7:
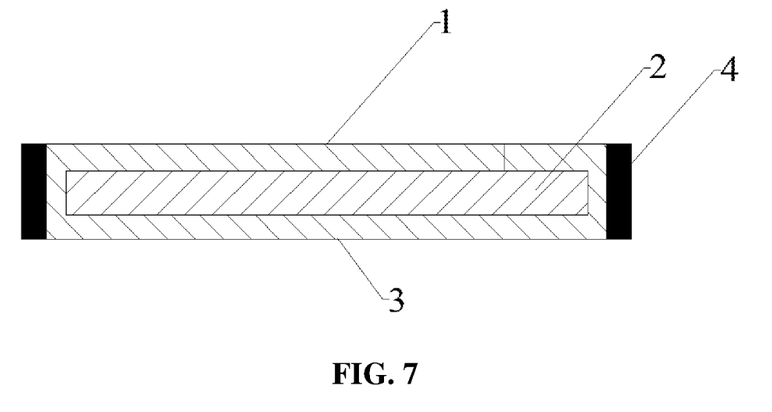
FIG. 7 illustrates a structure diagram of a bipolar electrode in Example 3.

Specifically, as shown in FIG. 7, the laminated structure in this Example is formed by connecting a single piece of polyacrylonitrile graphite felt end to end after folding for four times. The bipolar plate 2 is arranged in the hollow cavity of the laminated structure.

A preparation method of the integrated bipolar electrode in this Example may include the following steps.

(1) A polyacrylonitrile graphite felt with a length of 82 cm and a width of 40 cm was cut and submerged into deionized water for 10-30 min. The polyacrylonitrile graphite felt was taken out and placed in a centrifugal dryer to dewater for 1-2 min at a speed of 800-1200 rpm. APP film with a length of 40 cm and a width of 40 cm was cut.

(2) The 82 cm×40 cm polyacrylonitrile graphite felt was folded for four times to form the hollow cavity for receiving the bipolar plate 2. The polyacrylonitrile graphite felt was glued end to end with an epoxy resin. Then the cut PP film was placed in the cavity.

(3) Side surfaces of the folded polyacrylonitrile graphite felt/PP/fixe polyacrylonitrile graphite felt were bonded and sealed with the epoxy resin, thereby obtaining the integrated bipolar electrode of this Example.

The integrated bipolar electrode in this Example was assembled into a battery pack consisting of two cells through internal series connection. An energy efficiency of constant-current discharge and constant-current charge in presence of a current density of 100 mA cm$^{-2}$ is 79.5%. A coulombic efficiency thereof is 97.4%, An anolyte and a catholyte do not permeate into each other at all.

Example 4

An integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a silicon rubber film. The sealing layer 4 is an acid-resistant and oxidation-resistant epoxy resin.

Figure 8:
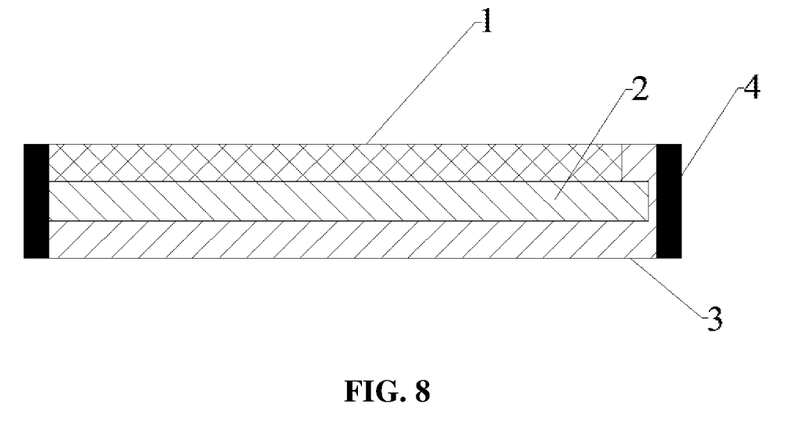
FIG. 8 illustrates a structure diagram of a bipolar electrode in Example 4.

Specifically, as shown in FIG. 8, in this Example, the anode active material layer 1 and the cathode active material layer 3 are two separate sheets with an identical width and different lengths. Three edges of the anode active material layer 1 are aligned to three edges of the cathode active material layer 3. The fourth edge of the bigger sheet is folded and is in direct contact with the fourth edge of the smaller sheet to form the laminated structure. The bipolar plate 2 is arranged in the hollow cavity of the laminated structure.

A preparation method of the integrated bipolar electrode in this Example may include the following steps.

(1) A polyacrylonitrile graphite felt with a length of 47 cm and a width of 31 cm and a polyacrylonitrile graphite felt with a length of 44 cm and a width of 31 cm were cut and submerged in deionized water for 10-30 min. The polyacrylonitrile graphite felts were taken out and placed in a centrifugal dryer to dewater for 1-2 min at a speed of 800-1200 rpm. A silicon rubber film with a length of 45 cm and a width of 31 cm was cut.

(2) The 31 cm×47 cm polyacrylonitrile graphite felt was horizontally spread on an operating platform. The cut silicon rubber film was placed on a surface of the polyacrylonitrile graphite felt. Then the 31 cm×44 cm polyacrylonitrile graphite felt was placed on a surface of the silicon rubber film such that three edges of each of the two polyacrylonitrile graphite felts were aligned to three edges of the silicon rubber film.

(3) The fourth edge of the polyacrylonitrile graphite felt at the bottom was folded upward along the fourth edge of the silicon rubber film and placed on a surface of the polyacrylonitrile graphite felt on the top. The polyacrylonitrile graphite felt on the top was in direct contact with the polyacrylonitrile graphite felt at the bottom. A contact part was pressed and glued with an epoxy resin.

(4) Side surfaces of the folded polyacrylonitrile graphite felt/the silicon rubber film/the polyacrylonitrile graphite felt were bonded and sealed with the epoxy resin, thereby obtaining the integrated bipolar electrode of this Example.

The integrated bipolar electrode in this Example was assembled into a battery pack consisting of two cells through internal series connection. An energy efficiency of constant-current discharge and constant-current charge in presence of a current density of 100 mA cm$^{-2}$ is 79.3%. A coulombic efficiency thereof is 97.2%. The anolyte and the catholyte do not permeate into each other at all.

Example 5

An integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a PP film. The sealing layer 4 is an acid-resistant and oxidation-resistant epoxy resin.

Specifically, the anode active material layer 1 and the cathode active material layer 3 are two separate sheets with different widths and different lengths. Two edges of the anode active material layer 1 are aligned to two edges of the cathode active material layer 3, The other two edges of the bigger sheet are folded and are in direct contact with the other two edges of the smaller sheet to form the laminated structure. The bipolar plate 2 is arranged in the hollow cavity of the laminated structure.

A preparation method of the integrated bipolar electrode in this Example may include the following steps.

(1) A polyacrylonitrile graphite felt with a length of 47 cm and a width of 31 cm and a polyacrylonitrile graphite felt with a length of 44 cm and a width of 28 cm were cut and submerged in deionized water for 10-30 min. The polyacrylonitrile graphite felts were taken out and placed in a centrifugal dryer to dewater for 1-2 min at a speed of 800-1200 rpm. A PP film with a length of 45 cm and a width of 29 cm was cut.

Figure 9:
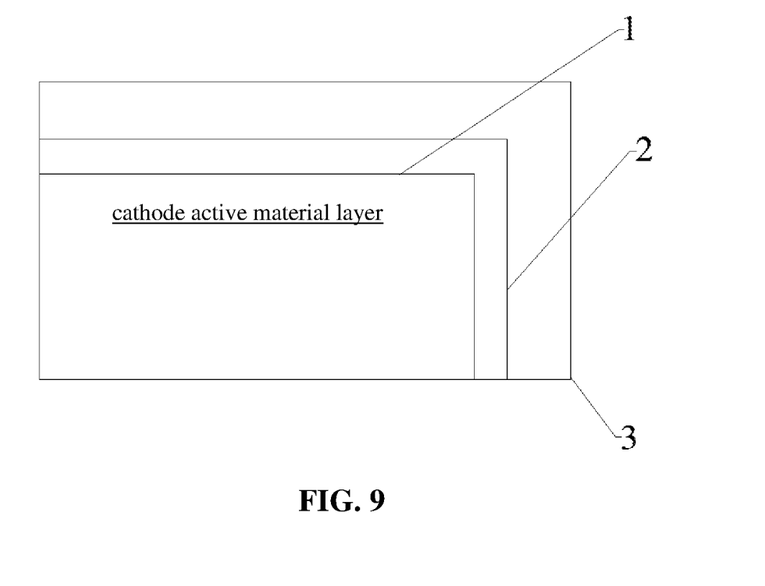
FIG. 9 illustrates a structure diagram (before folding) when a bipolar plate is sandwiched between an anode active material layer and a cathode active material layer in Example 5.

(2) The 47 cm×31 cm polyacrylonitrile graphite felt was horizontally spread on an operating platform. The cut PP film was placed on a surface of the polyacrylonitrile graphite felt in parallel. Then the 44 cm×28 cm polyacrylonitrile graphite felt was placed on the PP film in parallel, such that one corner of each of the two polyacrylonitrile graphite felts was overlapped with one corner of the PP film (as shown in FIG. 9).

(3) Two edges of the polyacrylonitrile graphite felt at the bottom were folded upward along two respective edges of the PP film and placed on the polyacrylonitrile graphite felt on the top, such that two edges of the polyacrylonitrile graphite felt on the top were in direct contact with the two respective edges of the polyacrylonitrile graphite felt at the bottom. Then a contact part was pressed and glued with an epoxy resin.

(4) Side surfaces of the folded polyacrylonitrile graphite felt/PP/the polyacrylonitrile graphite felt were bonded and sealed with the epoxy resin, thereby obtaining the integrated bipolar electrode of this Example.

The integrated bipolar electrode in this Example was assembled into a battery pack consisting of two cells through internal series connection. An energy efficiency of constant-current discharge and constant-current charge in presence of a current density of 100 mA cm$^{-2}$ is 79.1%. A coulombic efficiency thereof is 97.2%. The anolyte and the catholyte do not permeate into each other at all.

Example 6

An integrated bipolar electrode of this Example may include a laminated structure and a bipolar plate 2. The laminated structure is formed by interconnecting an anode active material layer 1 with a cathode active material layer 3. The bipolar plate 2 is sandwiched in a hollow cavity of the laminated structure. Side surfaces of the laminated structure are provided with a sealing layer 4 for mating with a bipolar electrode fixing frame to prevent an anolyte and a catholyte from permeating into each other.

In the bipolar electrode, both a material of the anode active material layer 1 and a material of the cathode active material layer 3 are a polyacrylonitrile graphite felt. The bipolar plate 2 is a PP film. The sealing layer 4 is an acid-resistant and oxidation-resistant epoxy resin.

Figure 10:
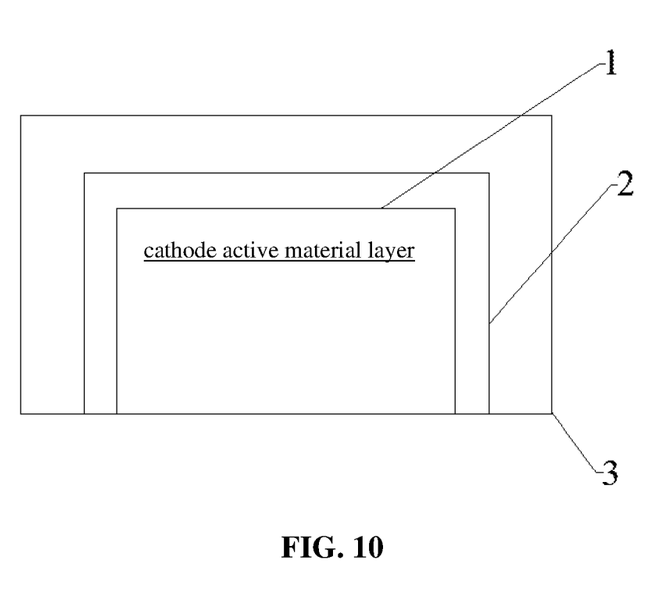
FIG. 10 illustrates a structure diagram (before folding) when a bipolar plate is sandwiched between an anode active material layer and a cathode active material layer in Example 6.

Specifically, as shown in FIG. 10, the anode active material layer 1 and the cathode active material layer 3 are two separate sheets having different widths and different lengths. Only one edge of the anode active material layer 1 is aligned to one edge of the cathode active material layer 3. The other three edges of the bigger sheet are folded and are in direct contact with the other three edges of the smaller sheet to form the laminated structure. The bipolar plate 2 is arranged in the hollow cavity of the laminated structure.

A preparation method of the integrated bipolar electrode in this Example may include the following steps.

(1) A polyacrylonitrile graphite felt with a length of 47 cm and a width of 31 cm and a polyacrylonitrile graphite felt with a length of 44 cm and a width of 28 cm were cut and submerged in deionized water for 10-30 min. The polyacrylonitrile graphite felts were taken out and placed in a centrifugal dryer to dewater for 1-2 min at a speed of 800-1200 rpm. A PP film with a length of 45 cm and a width of 29 cm was cut.

(2) The 47 cm×31 cm polyacrylonitrile graphite felt was horizontally spread on an operating platform. The cut PP film was placed on a surface of the polyacrylonitrile graphite felt in parallel. The 44 cm×28 cm polyacrylonitrile graphite felt was placed on the PP film in parallel, such that one long side of each of the two polyacrylonitrile graphite felts was overlapped with one long side of the PP film.

(3) The other three sides (namely, the three edges which were not aligned) of the polyacrylonitrile graphite felt at the bottom were folded upward along the three respective edges of the PP film and placed on the polyacrylonitrile graphite felt on the top. The three edges of the polyacrylonitrile graphite felt on the top were in direct contact with the three respective edges of the polyacrylonitrile graphite felt at the bottom. A contact part was pressed and glued with an epoxy resin.

(4) Side surfaces of the folded polyacrylonitrile graphite felt/PP/the polyacrylonitrile graphite felt were bonded and sealed with the epoxy resin, thereby obtaining the integrated bipolar electrode of this Example.

The integrated bipolar electrode in this Example was assembled into a battery pack consisting of two cells through internal series connection. An energy efficiency of constant-current discharge and constant-current charge in presence of a current density of 100 mA cm$^{-2}$ is 79.1%. A coulombic efficiency thereof is 97.0%. The anolyte and the catholyte do not permeate into each other at all.

Comparison Example

A routine current collector and two graphite felts (the two graphite felts were adhered to the two surfaces of the routine current collector through an external pressure) were assembled into a battery pack consisting of two cells through internal series connection. An energy efficiency of constant-current discharge and constant-current charge in presence of a current density of 100 mA cm$^{-2}$ is 75.3%, and a coulombic efficiency thereof is 97.7%.

From the Comparison Example, it can be seen that the energy efficiency of the constant-current discharge and the constant-current charge in presence of the current density of 100 mA cm$^{-2}$ is significantly reduced as for the battery pack assembled from the routine current collector and the two graphite felts.

The invention claimed is:

1. An integrated bipolar electrode, comprising a laminated structure and a bipolar plate, the laminated structure being formed by interconnecting an anode active material layer with a cathode active material layer, the bipolar plate being sandwiched in a hollow cavity of the laminated structure, side surfaces of the laminated structure being provided with a sealing layer for mating with a bipolar electrode fixing frame to prevent an anolyte and a catholyte from permeating into each other, wherein a material of the anode active material layer is same as a material of the cathode active material layer, the laminated structure is formed by folding a single piece of sheet in half, and the bipolar plate is arranged in the hollow cavity of the laminated structure.

2. The integrated bipolar electrode of claim 1, wherein the bipolar plate is a non-conductive sheet which does not react with the anolyte or the catholyte and is impermeable.

3. The integrated bipolar electrode of claim 1, wherein the anode active material layer and the cathode active material layer are graphite felts, carbon felts, carbon cloths or conductive sheets containing a carbon material.

4. The integrated bipolar electrode of claim 1, wherein a thickness h of the anode active material layer and/or the cathode active material layer at the side surface of the laminated structure is less than 1 mm.

5. The integrated bipolar electrode of claim 1, wherein the anode active material layer and/or the cathode active material layer positioned at the side surface of the laminated structure is in a net shape.

6. An integrated bipolar electrode, comprising a laminated structure and a bipolar plate, the laminated structure being formed by interconnecting an anode active material layer with a cathode active material layer, the bipolar plate being sandwiched in a hollow cavity of the laminated structure, side surfaces of the laminated structure being provided with a sealing layer for mating with a bipolar electrode fixing frame to prevent an anolyte and a catholyte from permeating into each other, wherein the anode active material layer and the cathode active material layer are two separate sheets, the hollow cavity of the laminated structure is a sealed cavity formed by folding the two separate sheets, and the bipolar plate is arranged in the sealed cavity.

7. A preparation method of an integrated bipolar electrode wherein the integrated bipolar electrode comprises a laminated structure and a bipolar plate, the laminated structure being formed by interconnecting an anode active material layer with a cathode active material layer, the bipolar plate being sandwiched in a hollow cavity of the laminated structure, side surfaces of the laminated structure being provided with a sealing layer for mating with a bipolar electrode fixing frame to prevent an anolyte and a catholyte from permeating into each other, wherein the method comprises:

wherein the method comprises:

S1: inserting a bipolar plate between an anode active material layer and a cathode active material layer to form a "sandwich" structure, folding an edge of the anode active material layer and/or the cathode active material layer along a side edge of the bipolar plate to make the anode active material layer interconnect with the cathode active material layer, and pressing a connected part;

S2: gluing the connected part in S1, so as to allow the anode active material layer and the cathode active material layer to form an interconnected whole; and S3: gluing and sealing side surfaces of the "sandwich" structure to form a sealing layer, thereby obtaining the integrated bipolar electrode.

8. The integrated bipolar electrode of claim 1, wherein the integrated bipolar electrode is prepared with a preparation method comprising:

S1: folding the single piece of sheet in half to form the anode active material layer and the cathode active material layer which have an identical area, then inserting the bipolar plate between the anode active material layer and the cathode active material layer to form a three-layer overlaid structure; and S2: gluing and sealing side surfaces of the three-layer overlaid structure to form the sealing layer, thereby obtaining the integrated bipolar electrode.

9. The integrated bipolar electrode of claim 1, wherein the integrated bipolar electrode is prepared with a preparation method comprising:

S1: folding the single piece of sheet to allow two ends of the single piece of sheet to be connected and form a cavity for receiving the bipolar plate, gluing the two ends of the single piece of sheet, and inserting the bipolar plate into the cavity to form a three-layer overlaid structure; and S2: gluing and sealing side surfaces of the three-layer overlaid structure to form the sealing layer, thereby obtaining the integrated bipolar electrode.

10. The integrated bipolar electrode of claim 6, wherein the integrated bipolar electrode is prepared with a preparation method comprising:

S1: inserting the bipolar plate between the two separate sheets to form a "sandwich" structure, then folding an edge of at least one of the two separated sheets along a side edge of the bipolar plate to allow the two separate sheets to be in direct contact with each other, then pressing and gluing a contact part, such that the bipolar plate is completely wrapped by the two separate sheets; and S2: gluing and sealing side surfaces of the "sandwich" structure to form the sealing layer, thereby obtaining the integrated bipolar electrode.

11. Use of an integrated bipolar electrode of claim 1 in an all-vanadium redox flow battery, wherein the all-vanadium redox flow battery comprises at least one integrated bipolar electrode, a bipolar electrode fixing frame for fixing the integrated bipolar electrode, and a diaphragm for separating an anolyte from a catholyte.

* * * * *